Jan. 13, 1931. O. H. HARTMANN 1,788,520
PROCESS AND APPARATUS FOR PRODUCING STEAM BY INDIRECT HEATING
Filed Sept. 29, 1927 3 Sheets-Sheet 1
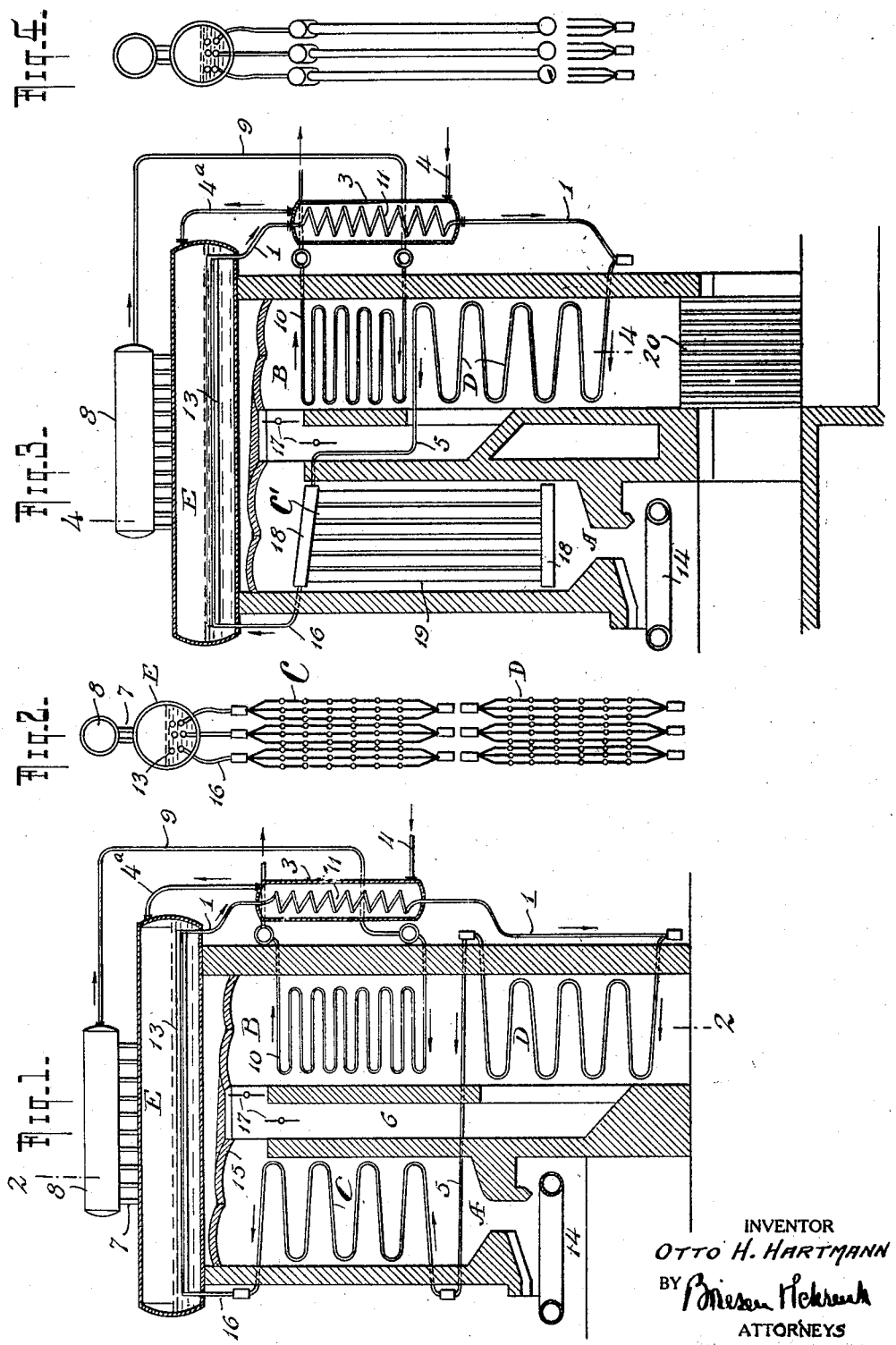
INVENTOR
OTTO H. HARTMANN
BY
ATTORNEYS

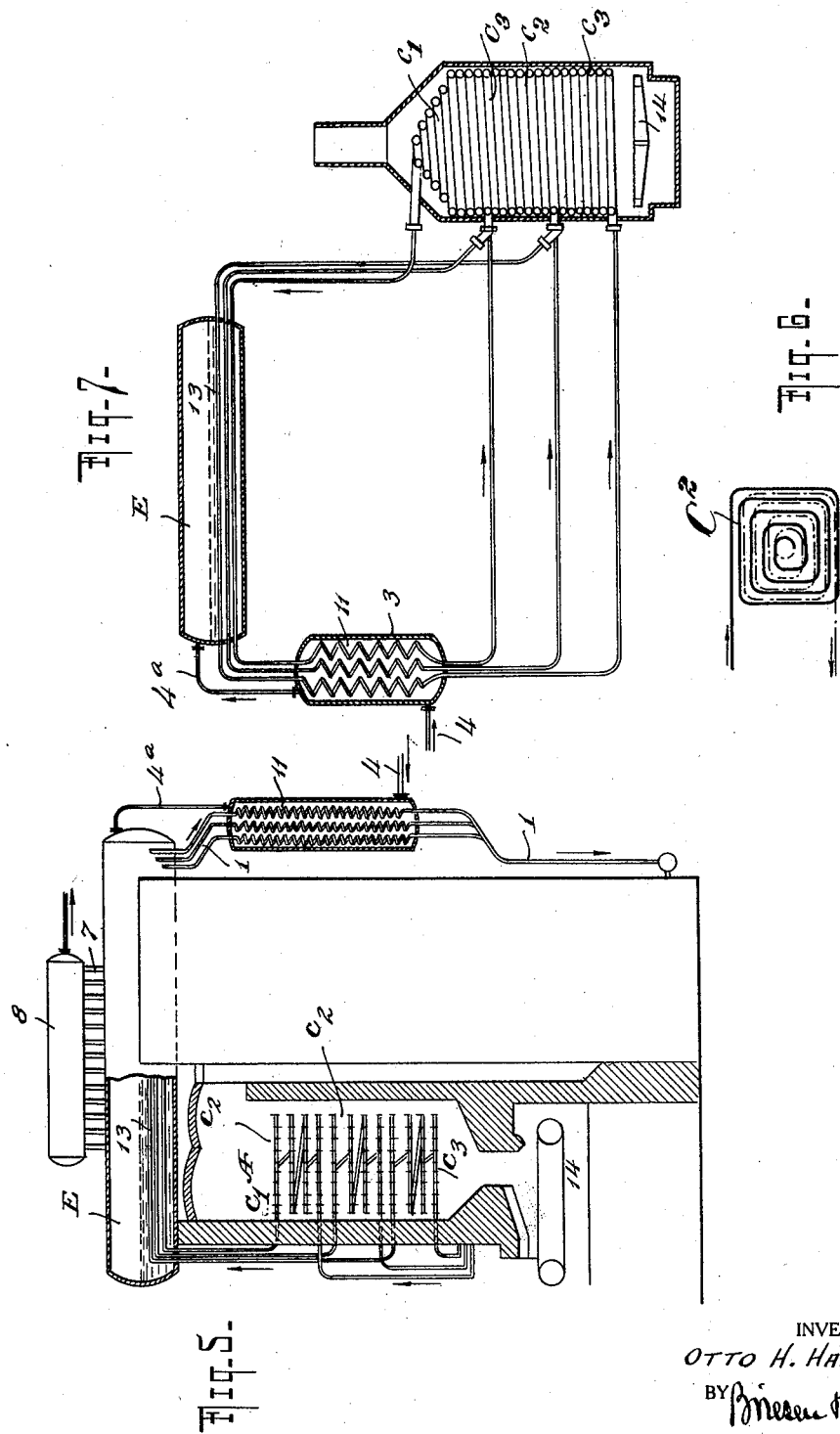

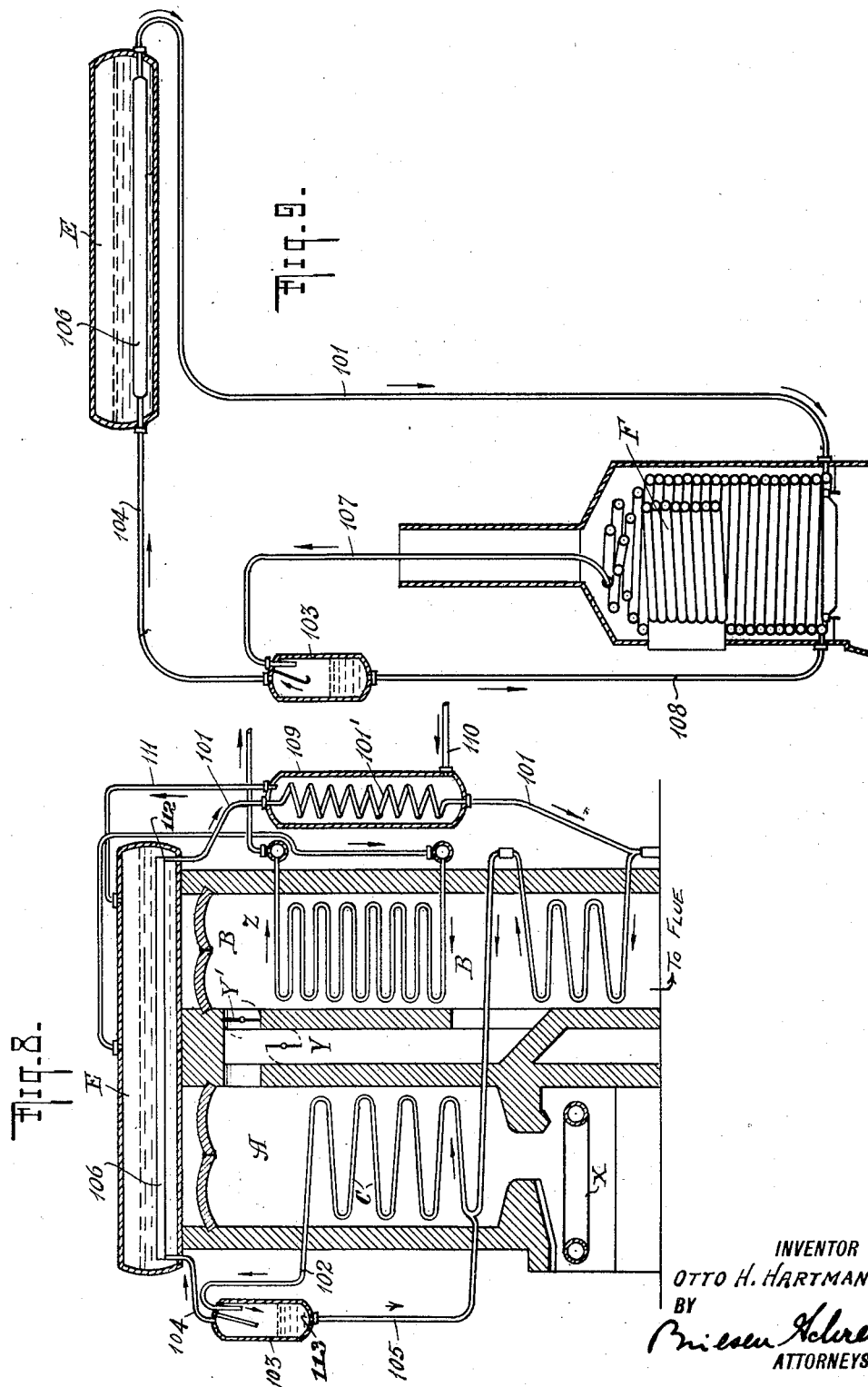

Patented Jan. 13, 1931

1,788,520

UNITED STATES PATENT OFFICE

OTTO H. HARTMANN, OF CASSEL-WILHELMSHOHE, GERMANY, ASSIGNOR TO SCHMIDT'SCHE HEISSDAMPF G. M. B. H., OF CASSEL-WILHELMSHOHE, GERMANY, A CORPORATION OF GERMANY

PROCESS AND APPARATUS FOR PRODUCING STEAM BY INDIRECT HEATING

Application filed September 29, 1927, Serial No. 222,905, and in Germany January 31, 1923.

My invention relates to the generation of live steam, and particularly of high-pressure steam, (that is to say, 20 atmospheres and over) with the aid of a heating medium receiving heat from the combustion gases and transferring such heat to the water to be converted into steam, such heating medium being circulated in a continuous closed path. According to my present invention, the heat of the furnace is transmitted to the water to be converted into steam with the aid of the vapor of the heating medium, and the generation of the vapor, such as steam when water is employed as the heating medium, is preferably conducted in at least two successive stages. The water (or other heating medium) to be converted into the steam constituting the heating medium is first heated in a portion of the apparatus exposed to the combustion gases which have previously come in contact with a vaporizing portion in which the water thus previously heated is converted into the steam forming the heating medium for the generation of steam in the main boiler. With my invention the entire boiler plant may be made of relatively small dimensions. The steam, or other vapor serving as the heating medium, will circulate without interruption in a closed path. The boiler proper containing the water from which the live steam is to be produced may be arranged in such a manner as not to be exposed to the injurious effect of the combustion gases. Owing to the subdivision of the generation of the heating medium into two stages, to wit pre-heating and vaporization, a very efficient utilization of the heat of the combustion gases is obtainable. The arrangement of parts and the path of the combustion gases are such that the plant will readily admit of the inclusion of a superheater which may be shut off when desired. A very important advantage of my present invention resides in the fact that it affords an absolutely safe boiler plant for the production of high-pressure steam. The heating medium circulates in narrow systems of piping which may be either sinuous, or coiled, or straight, and which contain a relatively small amount of water or other heating medium, thereby practically avoiding all danger of explosions. The vaporizing and the pre-heating portions of the circuit may be subdivided into sections in such a manner that the individual sections can be exchanged readily and that, in cases of injury to one section, the other section or sections of the circulation path may remain in operation while the injured part is being repaired. As compared with a certain existing device known to me, the new arrangement or subdivision of the circulation path has the advantage that all the sections of the path which form part of the same stage, for instance all sections of the pre-heater, of the vaporizer, of the device for transferring the heat to the water of the main boiler, etc., are exposed uniformly to the heating or the cooling medium. Thus there is, as it were, a parallel connection of the several sections of the same stage. Additional devices or arrangements serve for the more efficient carrying out of the invention and thus enable it to accomplish more completely the purpose which I have in view, that is to say, the provision of an efficient and safe boiler plant for the production of high-pressure steam with the aid of indirect heating. Of course, the steam which serves as a heating medium must be of a higher temperature than that of the live steam produced in the main boiler. Since it is well known that the temperature of saturated steam is a function of its pressure, it follows that the heating steam, when water is employed as the heating medium, must be under a pressure exceeding that of the live steam produced in the main boiler.

Since the conduits forming the closed path for the circulation of heating steam are relatively narrow and contain but a small amount of water, the generation of the heating steam in the closed path is liable to be accompanied by intensive boiling in the vaporizer section of said path, with the result that a certain proportion of water will be carried along by the heating steam. The water being a comparatively poor conductor of heat, the transfer of heat from the heat carrier or heating medium to the water in the main boiler will be much less efficient than if the heat carrier consisted of steam without water, and in order to compensate for this reduced efficiency, it has been found necessary to employ, in the separate generator, a very high steam pressure, and in the main boiler relatively large heat transferring surfaces.

The drawbacks explained above are avoided according to my present invention by removing from the steam serving as a heat carrier, any water contained therein, before such steam reaches the heat transferring surfaces located in the main boiler. This separation of water from the steam before the latter is brought in contact with the heat transferring surfaces may be accomplished in various ways. According to one species of my invention, a separator may be located at a proper point of the circulation path to remove such water from the steam. Another mode consists in subjecting the heating steam to the action of the heating gases for such a length of time that the heating steam will be in a dry condition at the time it reaches the heat transferring surfaces of the main boiler. When employing the first of these procedures, it is desirable to return the separated water to a suitable point of the circulation path of the heating steam. This will promote the circulation of the water and will insure a thorough cooling of the heating surface exposed to the action of the combustion gases. Another advantage of this arrangement is that only a relatively small amount of water will be required to flow in this case in the preheating portion of the circulation path which forms the first step in the heating process, i. e. in the pre-heater, the amount of water being just as much as is required for the generation of the heating steam, for, as stated above, any water carried over during the generation of such heating steam, is separated before it reaches the heat transfer device in the main boiler and is returned to the circulation system. The temperature of the condensate flowing back to this pre-heater is reduced correspondingly and the heat of the combustion gases is utilized very efficiently. If, for instance, in the vaporizer portion of the heating system, boiling should be so violent as to cause the heating steam to carry along about three times its weight of water, then, if the present invention were not used, the weight of the water flowing through the preheater of the circulating system would be four times as great as the weight of water converted into steam in the vaporizer. The amount (weight) of water necessary for the generation of the gaseous heat-carrier (the heating steam) would therefore be heated in the preheater through a range of temperature only one-fourth of that existing during normal working, that is when the amount of water reaching the vaporizer of the heating steam (gaseous heat-carrier) is just sufficient for the production of such heating steam, and no water is carried over owing to too violent boiling or evaporation in said vaporizer. During such abnormal working, therefore, the heat contained in the combustion gases would not be utilized so efficiently in a system lacking my present invention. When, however, according to my invention water is eliminated from the heating steam before such steam reaches the heat transferring surfaces in the main boiler, the efficiency of the boiler plant is increased considerably. A further advantage is that the pressure required for the circulation is reduced, since the velocity of the water is diminished in those parts of the circulation path which are exposed to the furnace gases, whereby the resistance to the flow is decreased.

This case is a continuation in part of applications Serial No. 678,561, filed December 5, 1923, and Serial No. 708,122, filed April 22, 1924.

Several typical examples of the present invention are illustrated by the accompanying drawings in which Fig. 1 is a diagrammatic sectional elevation of a stationary boiler and embodied in my present invention. Fig. 2 is a cross-section substantially on line 2—2 of Fig. 1. Figs. 3 and 5 are views similar to Fig. 1, illustrating two further embodiments of my invention. Fig. 4 is a vertical section substantially on line 4—4 of Fig. 3. Fig. 6 is a plan view of the vaporizer shown in Fig. 5, and Fig. 7 is a diagrammatic elevation, with parts in section, showing still another boiler plant embodying my invention. Figs. 8 and 9 are vertical sections of a somewhat diagrammatic character illustrating two further modifications of my present invention provided with a separator.

In the construction shown in Figs. 1 and 2, the combustion gases travel first through the flue-like portion or compartment A adjacent to the burner or furnace 14 and subsequently through the compartment B. The hottest portion of the combustion gases is thus brought into contact with the vaporizer C located in the compartment A and consisting of suitable tubing, the inlet of which, located at the lower portion of the vaporizer, is connected by a pipe 5 with the outlet located at the upper end of the pre-heater D located in compartment B. It will be understood that the medium employed for heating the steam in the main boiler E passes into the pre-heater D at the lower end thereof so that said medium (generally water) is heated, but usually not to the boiling point. The medium thus pre-heated then passes through the pipe 5 to the vaporizer C in which it is converted into vapor or steam by the heat of the hottest portion of the combustion gases. The boiler proper E is located above the path of the combustion gases and is preferably protected by a wall 15 against contact with such gases and against the direct radiation of heat from the furnace. If the main boiler E were heated directly by the combustion gases, there would be an accumulation of heat in those parts of the boiler-shell exposed to such combustion gases and there would result considerable temperature strains which, in boilers for the production of high-pressure steam, would soon subject the material of the boiler-shell to excessive fatigue, thus impairing its strength and rendering the boiler unserviceable after a relatively short time. From the vaporizer C a conduit, or set of conduits, 16 leads to a set of pipes 13 located within the water space of the main boiler E. The outlets of these pipes are connected with the inlet of the pre-heater D by means of a conduit 1. It will thus be seen that a complete or continuous circulation path is provided for the medium which, at one portion of such path, takes up heat from the combustion gases and at another portion of the same path transfers such absorbed heat to the water contained in the main boiler E. Preferably the vaporizer C, as well as the pre-heater D and the pipe system 13, consist of several sections as indicated in Fig. 2, connected with each other in any suitable manner. Owing to this arrangement defective or injured parts of the pre-heater, of the vaporizer, or of the heat-transferring pipes, may be removed and replaced readily. Fig. 2 shows each of the said successive portions made in three sections, and it will be obvious from the drawing that each of the sections of the same stage of the apparatus is exposed equally to the medium which is in contact with the outer surfaces of such sections. The individual sections of the same portion of the circuit are, as it were, connected in parallel, that is to say, not in series. Therefore, if any section should become defective the operation may be continued temporarily with the remaining sections alone. Above the main boiler E is shown a steam collector or drum 8 receiving steam from said boiler through a series of short pipes 7. From the steam collector 8 a conduit 9 leads to the superheater 10 which is located in the upper portion of the compartment B. By arranging the pre-heater D in the lower portion of the compartment B where the combustion gases are coolest, I not only insure an efficient utilization of the heat contained in the combustion gases but I also gain space for the installation of the superheater 10. The conduit, or conduits, 1 extends through a container, or containers, 3 and may be formed within said container into heaters 11 preferably of coiled or helical construction. This portion of the plant may then be utilized as a heater for feed-water on its way to the boiler, said feed-water entering the container, or containers, 3 at the bottom through a pipe 4 and passing from the top of the container through a pipe 4a to the boiler E. The heating medium circulating through the path described becomes cooled in the container 3 as it gives off its heat to the feed-water, and as the heating medium thus becomes condensed, and consequently heavier, its circulation is improved on the thermo-siphon principle. The hot gases, after traveling through the compartment A, may be directed by the dampers 17, either to the upper end of the compartment B, or to the lower portion of said compartment, through the flue 6. The superheater 10 may thus be cut off from the heating circuit when desired.

The entire plant is of very efficient and certain operation, that is to say, it does not readily get out of order, these advantages being obtained largely by the arrangement described for promoting the circulation of the heating medium and for sub-dividing the pre-heater, the vaporizer, etc.

It will be understood that Figs. 1 and 2 illustrate but one example of a plant embodying my invention and that various other constructions may be adopted. Thus in Figs. 3 and 4 I have illustrated a boiler plant in which the pre-heater D (of a sinuous shape similar to that shown in Fig. 1) supplies the pre-heated water through pipe 5 to the upper header 18 of the vaporizer C' which also comprises upright pipes 19 connected with the lower header 18. The water coming from the pipe 5 will travel downward in the pipes 19 so as to become heated and vaporized by the hot combustion gases, while the steam thus generated will pass upwardly to flow into the pipe 16 and thus reach the heating pipes 13 located within the main boiler E. The cool water tends to travel to the bottom of the pipes 19, while the heated water, being lighter than cool water, tends to rise in said pipes. The heating medium therefore circulates automatically within the vaporizer C' in substantially the same manner as the water in an ordinary steam boiler. At the lowermost portion of the compartment B I have indicated a heat exchange apparatus 20 for pre-heating the air on its way to the boiler furnace.

In Figs. 5 and 6 there is represented a vaporizer of such a shape and construction that it will practically fill the cross-section of the compartment A and thus insure a very efficient utilization of the heat contained in the combustion gases. This vaporizer C2 is subdivided into three superposed sections $c_1$, $c_2$, $c_3$, each having at its upper end an outlet connected with the respective pipe 13 located in the water space of the boiler E, and at its lower end an inlet connected with the pre-heater which is not illustrated but may be understood as being of the same character as those previously described in this specification. From the pipes 13 conduits 1 with feed-water heating portions 11 lead to the inlets of the portions of the pre-heater in substantially the same manner as described above. In this construction also there will be a plurality of separate and independent paths or circuits for the circulation of the heating medium.

According to Fig. 7 the vaporizer C3 is constructed as a fire box, directly above the furnace or grate 14. Like the vaporizer of Figs. 5 and 6, the one shown in Fig. 7 is constructed in three superposed sections $c1$, $c2$, $c3$ connected by pipes 2 with the outlets of the feed-water heating sections 11 and with the heating pipes 13 located in the boiler E. Each of these sections pre-heats and vaporizes the heating medium. In this case also there are three separate and independent circulation paths for the heating medium. The construction shown in Fig. 7 is particularly adapted for use in connection with portable boiler plants, for instance tractors, and the like.

It will be noted that the water resulting from the condensation of steam in the heating pipes 13 is cooled (specifically in the pipes 11) at a portion of its return path which lies at a higher level than the lowermost point of the circulation path, and particularly at a level above that of the inlet to the heat-receiving portion of said path. Thus the cool water will, owing to the increase of its specific gravity, sink to the lowermost portion of the circulation path, thereby not only promoting the circulation, but insuring that it shall take place in the proper direction.

In Figs. 8 and 9, X indicates a burner or a grate furnace from which combustion gases pass first upwardly through a chamber A and then downwardly through a chamber B, suitable dampers indicated at Y Y' being provided so that the combustion gases from the chamber A may pass either to the upper or to the middle portion of the chamber B, depending upon whether it is desired to utilize only the heater located in the lower portion of the chamber B or also the superheater arranged in the upper portion of said chamber B. When the superheater is cut off from the heating circuit, the position of the dampers Y, Y' is as indicated in the drawing, the combustion gases passing first through the flue-like portion or compartment immediately above the furnace X, then through chamber A, the open damper Y, and through the narrow passage between the two chambers, into the lower portion of chamber B and over the coils of the heater D to the flue, through the outlet below said heater. When it is desired to utilize the superheater located in the upper portion of chamber B, the position of the dampers is reversed from that shown in the drawing, the damper Y being closed and Y' being opened, the combustion gases then passing from chamber A, through damper Y' into chamber B and downwardly over the coils of the superheater and heater D, out to the stack. In these two chambers are arranged the parts constituting the pre-heater and the vaporizer for the heating medium. The pre-heater D is located in the lower portion of the chamber B, this heater being in the form of a coil, the upper end of which is connected with the vaporizer C located in the chamber A. The outlet of the vaporizer is connected by a pipe 102 with a separator 103 in which any of the liquid heating medium, such as water carried along by the vapor or steam is deposited, while the steam from which the water has thus been eliminated passes through a pipe 104 to heat exchange surfaces, for instance, a pipe 106 located within the water space of the main boiler E. The outlet 112 of the heat transferring device or pipe 106 has a return connection 101 leading to the lower portion of the heater D. This return connection may be formed with a coil 101' for heating the feed water for the main boiler E, in a chamber or container 109 having a water supply pipe 110 and a discharge pipe 111. The water collecting in the separator 103 is returned to the circulation path through a pipe 105 preferably to the lower end of the vaporizer C. The upper end 113 of the return pipe 105 connected to the separator 103 lies a considerable distance below the outlet 112 of the heating element 106. As a result of this difference in height, the water surface in the return connection 101 can never rise so high that it reaches the outlet 112 of the heating element 106. There is thus always present a definite drop which insures a reliable and rapid discharge of the condensate from the heating element. This condition is highly important for the proper functioning of the indirectly heated boiler E because a collection of condensate in the heating element would very unfavorably affect the heat transfer from the heating element 106 to the contents of the live steam boiler E. By means of the above described arrangement of the separator 103 and particularly of its water outlet 113 and return pipe 105 with relation to the outlet 112 of the heating element 106, it is insured that the passageways for the heating steam in the heating element are constantly maintained free and open so that the transfer of heat necessary for an efficient production of high pressure live steam can take place through the walls of the heating element. At Z I have indicated a superheating coil located in the upper portion of the chamber B, said coil receiving steam from the main boiler E and delivering said steam to the place of use, for instance a steam engine.

In the construction illustrated by Fig. 9, the steam constituting the heat carrier is produced by the combustion gases in a fire box F. The upper end of the steam generating coil is connected by a pipe 107 with a separator 103 of the same character as in Fig. 8, the upper end of the separator having a connection 104 for carrying the dry steam to the heat transferring device 106. The water which collects at the bottom of the separator 103 is returned to the circulation path preferably at the lower end of the steam producing coils, through a pipe 108. This particular form of my invention is especially adapted for use in connection with portable steam power plants. It will be understood that in the pipe or other heat transferring device 106, the steam gives off its heat through the walls of said pipe to the water contained in the boiler E, and then the heating steam being thus cooled is condensed, the condensation product flowing downwardly through the return connection 101 to the producer in which a mixture of water and steam is generated.

Various changes in the specific form shown and described may be made within the scope of the claims without departing from the spirit of my invention.

I claim:

1. A steam generating plant, comprising a boiler having a steam space and a water space, a heating pipe in the water space of the boiler, a substantially tubular vaporizer the outlet of which is connected with the inlet of said heating pipe, a substantially tubular liquid-heater the outlet of which is connected with the inlet of said vaporizer, a body of liquid in said vaporizer and liquid-heater of less volume than the combined volume thereof, a return connection from the outlet of said heating pipe to the inlet of said liquid-heater to complete the path for the circulation of said liquid and its vapors, a superheater connected with the steam space of said boiler, a conduit for conveying hot gases into contact first with said vaporizer, then with the superheater, and subsequently with the said liquid-heater, a by-pass through which said hot gases may travel from the vaporizer directly to the liquid-heater without coming in contact with the superheater, and a controlling device for directing the hot gases either through said conduit or through said by-pass.

2. A steam generating plant, comprising a boiler having a steam space and a water space, a heating pipe in the water space of the boiler, a substantially tubular vaporizer the outlet of which is connected with the inlet of said heating pipe, a separator interposed between said outlet and inlet, a substantially tubular liquid-heater the outlet of which is connected with the inlet of said vaporizer, a body of liquid in said vaporizer and liquid-heater of less volume than the combined volume thereof, a return connection from the outlet of said heating pipe to the inlet of said liquid-heater to complete the path for the circulation of said liquid and its vapors, a superheater connected with the steam space of said boiler, a conduit for conveying hot gases into contact first with said vaporizer, then with the superheater, and subsequently with the said liquid-heater, a by-pass through which said hot gases may travel from the vaporizer directly to the liquid-heater without coming in contact with the superheater, and a controlling device for directing the hot gases either through said conduit or through said by-pass.

3. A steam generating plant, comprising a boiler having a steam space and a water space, a substantially tubular heat transfer device in the water space of the boiler, a liquid vaporizer partially filled with a liquid, a furnace for heating said vaporizer, the outlet of the vaporizer being connected with the inlet of said heat transfer device, a separator interposed between said outlet and inlet, and located out of the path of the hot gases of the furnace, a return connection from the outlet of said heat transfer device to the inlet of said vaporizer and located externally of the vaporizer heating space of the furnace, to complete the path for the circulation of said liquid and its vapors, and a return pipe leading from said separator to the lower end of said vaporizer, and located mainly externally of the vaporizer heating space of the furnace, the inlet of said return pipe being situated at a level lower than that of the outlet of the said heat transfer device, and the body of liquid in such vaporizer being of such quantity that, when the plant is in operation, the heat transmitting medium delivered from the vaporizer to the tubular heat transfer device consists substantially of the vapor of such liquid.

4. The process of generating live steam which comprises causing hot gases to give off their heat to a substance which is liquid under the conditions of operation and convert such liquid into wet high pressure vapor, drying such vapor by separating the entrained liquid therefrom and returning such liquid, by a path different from the path of such wet vapor, to the body of liquid heated by said gases, bringing the vapor thus produced into heat exchange relation to a separate body of water to be converted into live steam of a pressure lower than that of said vapor, the latter giving up its heat to such separate body of water and condensing, and bringing the liquid resulting from the condensation of said vapor back into heat exchange relation with said hot gases.

OTTO H. HARTMANN.